A. W. Olds,
Wood Fence,
N° 56,441. Patented July 17, 1866.
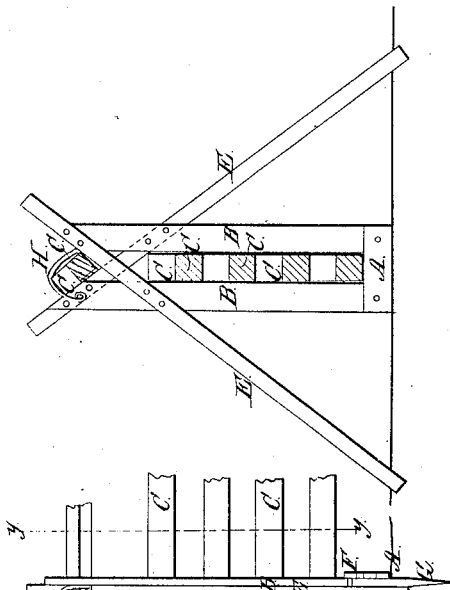
Fig. 2.
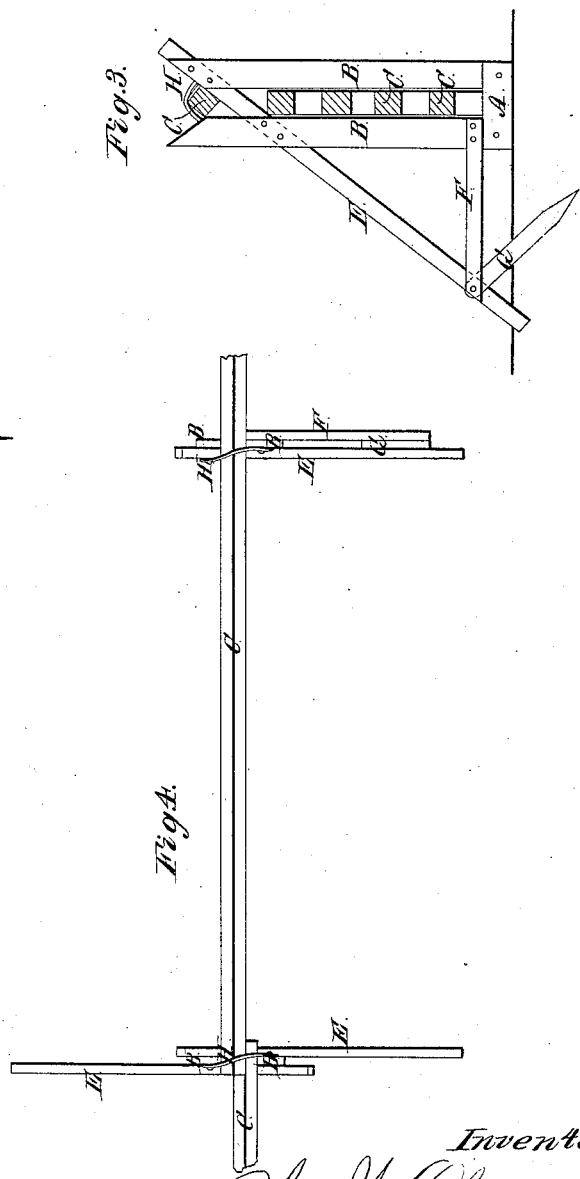
Fig. 3.
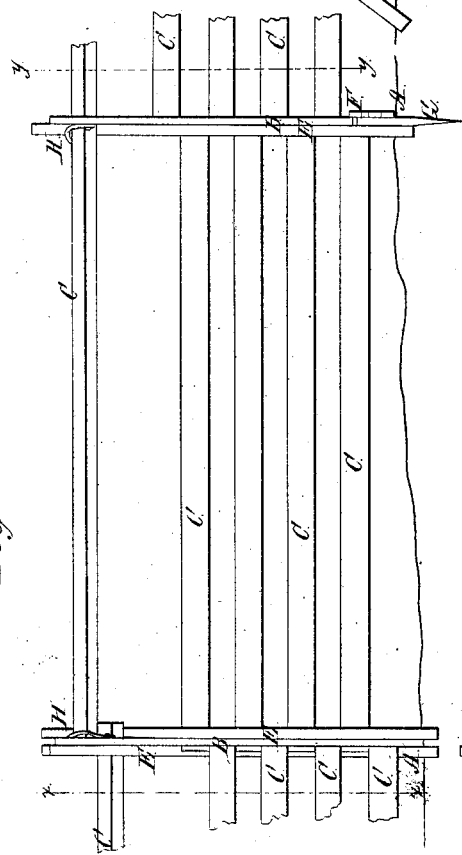
Fig. 1.
Fig. 4.
Witnesses.
Inventor.

UNITED STATES PATENT OFFICE.

A. W. OLDS, OF GREEN OAK, MICHIGAN.

IMPROVEMENT IN FENCES.

Specification forming part of Letters Patent No. 56,441, dated July 17, 1866.

*To all whom it may concern:*

Be it known that I, ALONZO W. OLDS, of Green Oak, in the county of Livingston and State of Michigan, have invented a new and useful Improvement in Constructing Fences; and I do hereby declare that the following is a full, clear, and exact description thereof, which will enable others skilled in the art to make and use the same, reference being had to the accompanying drawings, forming part of this specification, in which—

Figure 1 is a side view of a portion of my improved fence. Fig. 2 is a vertical cross-section through the line $x\,x$, Fig. 1, looking toward the right. Fig. 3 is a vertical cross-section through the line $y\,y$, Fig. 1, looking toward the left. Fig. 4 is a top view of a portion of my improved fence.

Similar letters of reference indicate like parts.

My invention has for its object the furnishing a fence cheap, durable, adapted to any inclination of surface, and which will resist heavy winds; and it consists, first, in a fence each of the braces or stakes of which are secured to both the uprights or standards that hold the overlapping ends of the rails in place; second, in combining a wire with the uprights and with the top rails of the fence; third, the combination of a short stake with the long stake and with the bottom of the fence, as hereinafter more fully described.

A are the foundation blocks or strips upon which the fence is supported, and which keep the bottom rails from coming in contact with the ground, and their consequent speedy decay.

B are the uprights or standards, which are attached at their lower ends to the foundation-blocks A, and which hold the overlapping ends of the rails in their places.

The rails C and the uprights B may be attached to each other by nails, spikes, or bolts passing through both the uprights and through the ends of the rails C, or the nails may be driven through the ends of the rails C and into one of the uprights B, their heads being covered by the other upright.

E are the braces or stakes, the lower ends of which are driven into the ground, and their upper ends are attached to both the uprights B, as shown in Fig. 2, one brace or stake being on each side of said uprights. By raising or lowering these stakes, or by varying their lengths, the fence may be made to conform to the surface of the ground.

When the fence is erected along the side of a road or in situations where it is necessary to plow close up to the side of the fence, one of the braces, E, may be omitted; but in this case the fence should be strengthened by a horizontal brace, F, running from the lower part of the uprights B to the lower part of the braces E, and also by a short stake, G, driven into the ground at right angles to the stake or brace E, as shown in Fig. 3. This direction of the stake G not only braces the fence, but also tends to prevent both itself and the stake E from being thrown out by the frost.

The top rails are laid overlapping each other in the angles formed by the stakes or braces E, the upper ends of the uprights B being cut with an inclination corresponding to the inclination of the braces E, as seen in Figs. 2 and 3. The top rails, C, are secured in place and protected against being thrown off by unruly cattle or by the wind by means of the wires H, which pass over the overlapped ends of the top rails, C, and their ends are attached to the upper ends of the uprights B, as shown in the drawings.

I claim as new and desire to secure by Letters Patent—

The braces E E, when secured to the uprights B B, as described, in combination with the upper rail and binding-wire H, as and for the purpose set forth.

The above specification of my invention signed by me this 13th day of November, 1865.

A. W. OLDS.

Witnesses:
ROBERT WARDEN,
LAURA WARDEN.